United States Patent
Zhao et al.

(10) Patent No.: US 11,204,441 B1
(45) Date of Patent: Dec. 21, 2021

(54) OIL-GAS RESERVOIR EXPLORATION METHOD AND APPARATUS

(71) Applicant: DAGANG OIL FIELD COMPANY OF CNPC, Tianjin (CN)

(72) Inventors: Xianzheng Zhao, Tianjin (CN); Fengming Jin, Tianjin (CN); Xiugang Pu, Tianjin (CN); Qun Luo, Tianjin (CN); Lihong Zhou, Tianjin (CN); Wenya Jiang, Tianjin (CN); Xiongying Dong, Tianjin (CN); Wenzhong Han, Tianjin (CN); Zhannan Shi, Tianjin (CN); Wei Zhang, Tianjin (CN); Hu Wang, Tianjin (CN)

(73) Assignee: DAGANG OIL FIELD COMPANY OF CNPC, Tianjin (CN)

( * ) Notice: Subject to any disclaimer, the term of this patent is extended or adjusted under 35 U.S.C. 154(b) by 0 days.

(21) Appl. No.: 17/107,380

(22) Filed: Nov. 30, 2020

(30) Foreign Application Priority Data

Sep. 29, 2020 (CN) .......................... 202011053470.6

(51) Int. Cl.
  *G01V 11/00* (2006.01)
  *E21B 49/00* (2006.01)
(52) U.S. Cl.
  CPC ............ *G01V 11/002* (2013.01); *E21B 49/00* (2013.01)

(58) Field of Classification Search
  CPC ............................. G01V 11/002; E21B 49/00
  See application file for complete search history.

(56) References Cited

U.S. PATENT DOCUMENTS

| | | | | |
|---|---|---|---|---|
| 7,822,554 | B2* | 10/2010 | Zuo ........................ | E21B 49/08 702/6 |
| 8,577,613 | B2* | 11/2013 | Bryant .................... | E21B 43/00 702/6 |
| 10,083,258 | B2* | 9/2018 | Kauerauf ................ | G06F 30/20 |
| 10,228,478 | B2* | 3/2019 | Li ........................... | G01V 1/302 |
| 10,551,525 | B2* | 2/2020 | Harris .................... | G01V 99/005 |

* cited by examiner

Primary Examiner — Elias Desta
(74) Attorney, Agent, or Firm — Calfee Halter & Griswold LLP

(57) ABSTRACT

Embodiments of the present invention provide an oil-gas reservoir exploration method and apparatus and belong to the technical field of oil-gas exploration. The method includes: acquiring hydrocarbon source rock distribution, reservoir distribution, fault distribution and oil-gas reservoir distribution; determining at least one oil-gas accumulation chain according to the hydrocarbon source rock distribution, the reservoir distribution, the fault distribution and the oil-gas reservoir distribution; and determining exploration targets and an exploration order of oil-gas reservoirs according to the at least one oil-gas accumulation chain and the oil-gas reservoirs on the oil-gas accumulation chain. By using the oil-gas reservoir exploration method and apparatus, the exploration targets and the exploration order may be precisely and rapidly determined.

5 Claims, 4 Drawing Sheets

OIL-GAS RESERVOIR EXPLORATION METHOD AND APPARATUS

CROSS REFERENCE TO RELATED APPLICATIONS

This application claims priority to Chinese Application No. 202011053470.6, filed on Sep. 29, 2020, entitled "OIL-GAS RESERVOIR EXPLORATION METHOD AND APPARATUS", which is specifically and entirely incorporated by reference.

FIELD OF THE INVENTION

The present invention relates to the technical field of oil-gas exploration and in particular to an oil-gas reservoir exploration method and apparatus.

BACKGROUND OF THE INVENTION

As a result of 160 years of exploration in petroleum industry, most of oil and gases which are simple and easy to discover have been explored except the complex and hidden oil-gas reservoirs (mainly stratigraphic and lithologic oil-gas reservoirs) with high exploration difficulty and unconventional oil-gas reservoirs, which exist in various complex and hidden traps and sweet spots of unconventional reservoirs so as to be high in exploration risk and low in exploration success ratio.

As oil-gas exploration continues to go deep into sources, geological conditions for forming oil-gas reservoirs are more complex, and positions where the oil-gas reservoirs exist are more hidden, hidden oil-gas reservoirs and unconventional oil-gas reservoirs which are more complex and difficult to discover have not been precisely predicted at present, and poor prediction precision, poor accuracy and long exploration period are caused.

SUMMARY OF THE INVENTION

The purposes of embodiments of the present invention are to provide an oil-gas reservoir exploration method and apparatus by which exploration targets and an exploration order may be precisely and rapidly determined.

In order to achieve the above-mentioned purposes, embodiments of the present invention provide an oil-gas reservoir exploration method. The method includes: acquiring hydrocarbon source rock distribution, reservoir distribution, fault distribution and oil-gas reservoir distribution; determining at least one oil-gas accumulation chain according to the hydrocarbon source rock distribution, the reservoir distribution, the fault distribution and the oil-gas reservoir distribution; and determining exploration targets and an exploration order of oil-gas reservoirs according to the at least one oil-gas accumulation chain and the oil-gas reservoirs on the oil-gas accumulation chain.

Further, acquiring oil-gas reservoir distribution comprises: acquiring trap distribution, unconventional oil-gas reservoir distribution and/or discovered oil-gas reservoir distribution.

Further, determining at least one oil-gas accumulation chain according to the hydrocarbon source rock distribution, the reservoir distribution, the fault distribution and the oil-gas reservoir distribution comprises: determining at least one dominant migration path for oil-gas to migrate from a hydrocarbon source according to the hydrocarbon source rock distribution, the reservoir distribution and the fault distribution; and determining the at least one oil-gas accumulation chain based on the oil-gas reservoir distribution according to the at least one dominant migration path.

Further, determining at least one dominant migration path for oil-gas to migrate from a hydrocarbon source according to the hydrocarbon source rock distribution, the reservoir distribution and the fault distribution comprises: determining connecting paths from the hydrocarbon source to structural ridges of continuously distributed reservoirs and structural ridges of faults as the at least one dominant migration path.

Further, determining exploration targets and an exploration order of oil-gas reservoirs according to the at least one oil-gas accumulation chain and the oil-gas reservoirs on the oil-gas accumulation chain comprises: determining an oil-gas accumulation chain with the most traps and/or sweet spots of unconventional oil-gas reservoirs in the at least one oil-gas accumulation chain as a to-be-explored oil-gas accumulation chain; determining traps and/or sweet spots of unconventional oil-gas reservoirs on the to-be-explored oil-gas accumulation chain as the exploration targets of the oil-gas reservoirs; and determining the exploration order of the oil-gas reservoirs according to sizes of the traps and/or the sweet spots of unconventional oil-gas reservoirs on the to-be-explored oil-gas accumulation chain and distances from the traps and/or the sweet spots to the hydrocarbon source.

The present invention further provides an oil-gas reservoir exploration apparatus. The apparatus includes: an acquiring unit and a processing unit, wherein the acquiring unit is configured to acquire hydrocarbon source rock distribution, reservoir distribution, fault distribution and oil-gas reservoir distribution; and the processing unit is configured to: determine at least one oil-gas accumulation chain according to the hydrocarbon source rock distribution, the reservoir distribution, the fault distribution and the oil-gas reservoir distribution; and determine exploration targets and an exploration order of oil-gas reservoirs according to the at least one oil-gas accumulation chain and the oil-gas reservoirs on the oil-gas accumulation chain.

Further, the acquiring unit is configured to: acquire trap distribution, unconventional oil-gas reservoir distribution and/or discovered oil-gas reservoir distribution.

Further, the processing unit is configured to: determine at least one dominant migration path for oil-gas to migrate from a hydrocarbon source according to the hydrocarbon source rock distribution, the reservoir distribution and the fault distribution; and determine the at least one oil-gas accumulation chain based on the oil-gas reservoir distribution according to the at least one dominant migration path.

Further, the processing unit is configured to: determine connecting paths from the hydrocarbon source to structural ridges of continuously distributed reservoirs and structural ridges of faults as the at least one dominant migration path.

Further, the processing unit is configured to: determine an oil-gas accumulation chain with the most traps and/or sweet spots of unconventional oil-gas reservoirs in the at least one oil-gas accumulation chain as a to-be-explored oil-gas accumulation chain; determine traps and/or sweet spots of unconventional oil-gas reservoirs on the to-be-explored oil-gas accumulation chain as the exploration targets of the oil-gas reservoirs; and determine the exploration order of the oil-gas reservoirs according to sizes of the traps and/or the sweet spots of unconventional oil-gas reservoirs on the to-be-explored oil-gas accumulation chain and distances from the traps and/or the sweet spots to the hydrocarbon source.

According to the above-mentioned technical solution in which the oil-gas reservoir exploration method and apparatus provided by the present invention are adopted, and by using the oil-gas reservoir exploration method and apparatus, the exploration targets and the exploration order may be precisely and rapidly determined.

Other features and advantages of the embodiments of the present invention will be described in detail in the following specific implementation part.

BRIEF DESCRIPTION OF THE DRAWINGS

The accompanying drawings are provided for further understanding of the embodiments of the present invention, and constitute one part of the specification. They serve to explain the embodiments of the present invention in conjunction with the following specific implementations, rather than to limit the embodiments of the present invention. In the accompanying drawings.

Description for symbols in the accompanying drawings:
1. acquiring unit 2. processing unit

DETAILED DESCRIPTION OF THE EMBODIMENTS

The specific implementations of the embodiments of the present invention are described in detail below in conjunction with the accompanying drawings. It should be understood that the specific implementations described herein are merely intended to describe and explain the embodiments of the present invention, rather than to limit the embodiments of the present invention.

Figure 1:
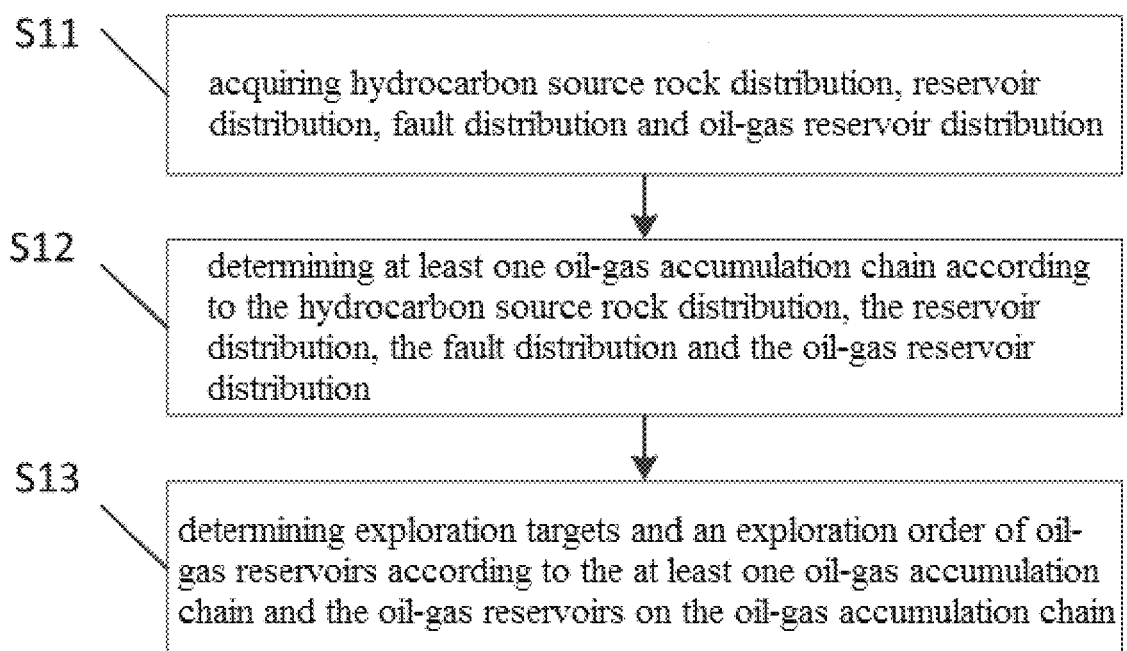
FIG. 1 is a flow diagram showing an oil-gas reservoir exploration method provided by an embodiment of the present invention.

FIG. 1 is a flow diagram showing an oil-gas reservoir exploration method provided by an embodiment of the present invention. As shown in FIG. 1, the method includes the steps.

Step S11, hydrocarbon source rock distribution, reservoir distribution, fault distribution and oil-gas reservoir distribution are acquired.

For example, the oil-gas reservoir distribution includes trap distribution, unconventional oil-gas reservoir distribution and/or discovered oil-gas reservoir distribution. The hydrocarbon source rock distribution, the reservoir distribution, the fault distribution and the oil-gas reservoir distribution may be obtained by acquiring structural maps of the hydrocarbon source rock distribution, the reservoir distribution, the fault distribution and the oil-gas reservoir distribution. It can be understood that the hydrocarbon source rock distribution, the reservoir distribution, the fault distribution and the oil-gas reservoir distribution refer to hydrocarbon source rock distribution, reservoir distribution, fault distribution and oil-gas reservoir distribution in a to-be-explored area.

Step S12, at least one oil-gas accumulation chain is determined according to the hydrocarbon source rock distribution, the reservoir distribution, the fault distribution and the oil-gas reservoir distribution.

Figure 2:
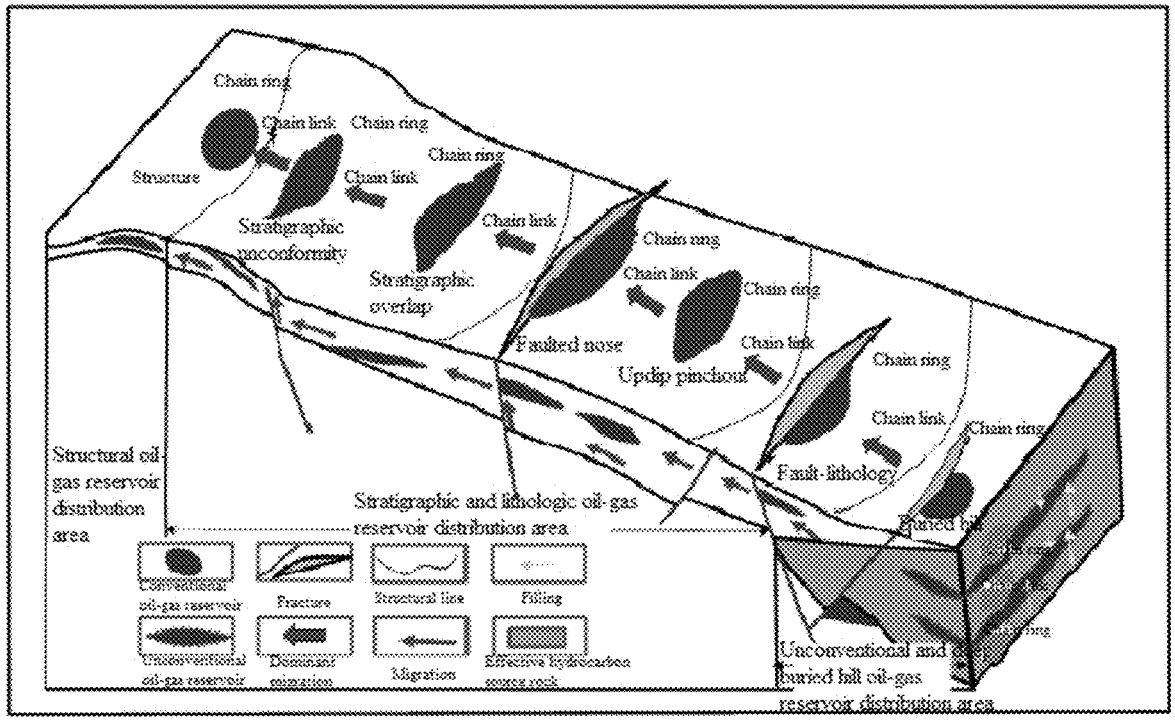
FIG. 2 is a schematic diagram showing a basic element and an oil accumulation mechanism of an oil-gas accumulation chain provided by an embodiment of the present invention.
Figure 3:
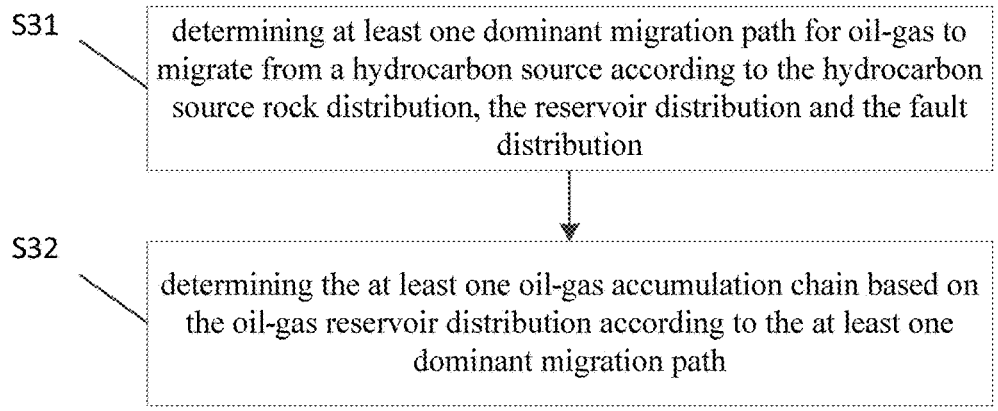
FIG. 3 is a flow diagram showing a method for determining an oil-gas accumulation chain, provided by an embodiment of the present invention.
Figure 4:
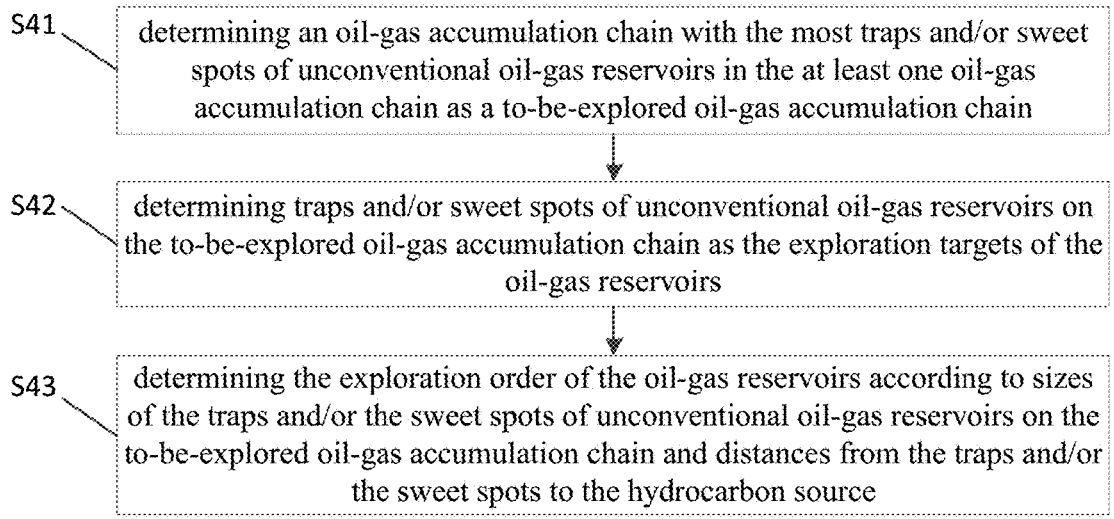
FIG. 4 is a flow diagram showing a method for determining exploration targets and an exploration order of oil-gas reservoirs, provided by an embodiment of the present invention.

For example, the "oil-gas accumulation chain" in the present embodiment refers to a combination of a series of oil-gas reservoirs, beginning from a hydrocarbon source rock, which are closely related in terms of cause of formation and are arranged in a chain shape in terms of distribution. Herein, the hydrocarbon source rock serves as a chain source of the oil-gas accumulation chain, oil-gas reservoirs serve as "rings" of the oil-gas accumulation chain, migration pathways among the oil-gas reservoirs serve as "links" of the oil-gas accumulation chain, as shown in FIG. 2. Each of the oil-gas reservoirs is obtained by continuous oil-gas enrichment and spatial chained (chain-shaped or bead-like) distribution through events such as hydrocarbon supply of the hydrocarbon source rock, hydrocarbon migration of the migration pathways, hydrocarbon accumulation of a trap space and hydrocarbon enrichment of sweet spots of unconventional oil-gas reservoirs. The oil-gas accumulation chain is an essential characteristic of formation and distribution of the oil-gas reservoirs. According to the embodiment of the present invention, the at least one oil-gas accumulation chain may be determined according to the hydrocarbon source rock distribution, the reservoir distribution, the fault distribution and the oil-gas reservoir distribution, for example, steps S31-S32 may be included.

Step S31, at least one dominant migration path for oil-gas to migrate from a hydrocarbon source is determined according to the hydrocarbon source rock distribution, the reservoir distribution and the fault distribution.

For example, a plurality of connecting paths from the hydrocarbon source (that is, the hydrocarbon source rock) to structural ridges of continuously distributed reservoirs and structural ridges of faults are determined, then, whether these connecting paths are the dominant migration paths may be determined according to an oil-gas effective migration pathway index, that is, the oil-gas effective migration pathway index is calculated according to the following formula:

the oil-gas effective migration pathway index=oil content, oil immersion, oil spot, oil stain, total thickness (h) of 50% fluorescence/thickness (H) of a sandstone transportation layer.

The oil-gas effective migration pathway index along the path should be gradually reduced from the hydrocarbon source, there is the oil-gas effective migration pathway index in the overall path, and such a path may be determined as the dominant migration path. Therefore, the at least one dominant migration path is obtained.

Step S32, the at least one oil-gas accumulation chain is determined based on the oil-gas reservoir distribution according to the at least one dominant migration path.

For example, the oil-gas reservoir distribution is found on the at least one dominant migration path, and the dominant migration path and the oil-gas reservoir distribution jointly form the oil-gas accumulation chain, and therefore, the at least one oil-gas accumulation chain may be obtained.

Step S13, exploration targets and an exploration order of oil-gas reservoirs are determined according to the at least one oil-gas accumulation chain and the oil-gas reservoirs on the oil-gas accumulation chain.

For example, the exploration targets and the exploration order of the oil-gas reservoirs may be determined by step S41-S43 in the embodiment of the present invention.

Step S41, an oil-gas accumulation chain with the most traps and/or sweet spots of unconventional oil-gas reservoirs in the at least one oil-gas accumulation chain is determined as a to-be-explored oil-gas accumulation chain.

For example, firstly, the oil-gas accumulation chain with the most traps and/or sweet spots of unconventional oil-gas reservoirs is found, the oil-gas reservoirs of the oil-gas accumulation chain should be primarily explored and drilled. Of course, oil-gas reservoirs of other oil-gas accumulation chains may be explored later.

Step S42, traps and/or sweet spots of unconventional oil-gas reservoirs on the to-be-explored oil-gas accumulation chain are determined as the exploration targets of the oil-gas reservoirs.

For example, all the traps and/or the sweet spots of unconventional oil-gas reservoirs on the to-be-explored oil-gas accumulation chain are targets to be explored.

Step S43, the exploration order of the oil-gas reservoirs is determined according to sizes of the traps and/or the sweet spots of unconventional oil-gas reservoirs on the to-be-explored oil-gas accumulation chain and distances from the traps and/or the sweet spots to the hydrocarbon source.

For example, all the traps and/or the sweet spots of unconventional oil-gas reservoirs on the to-be-explored oil-gas accumulation chain are explored in order, the larger trap and/or the sweet spot of unconventional oil-gas reservoir and the trap and/or the sweet spot of unconventional oil-gas reservoir closer to the hydrocarbon source are explored more early.

Figure 5:
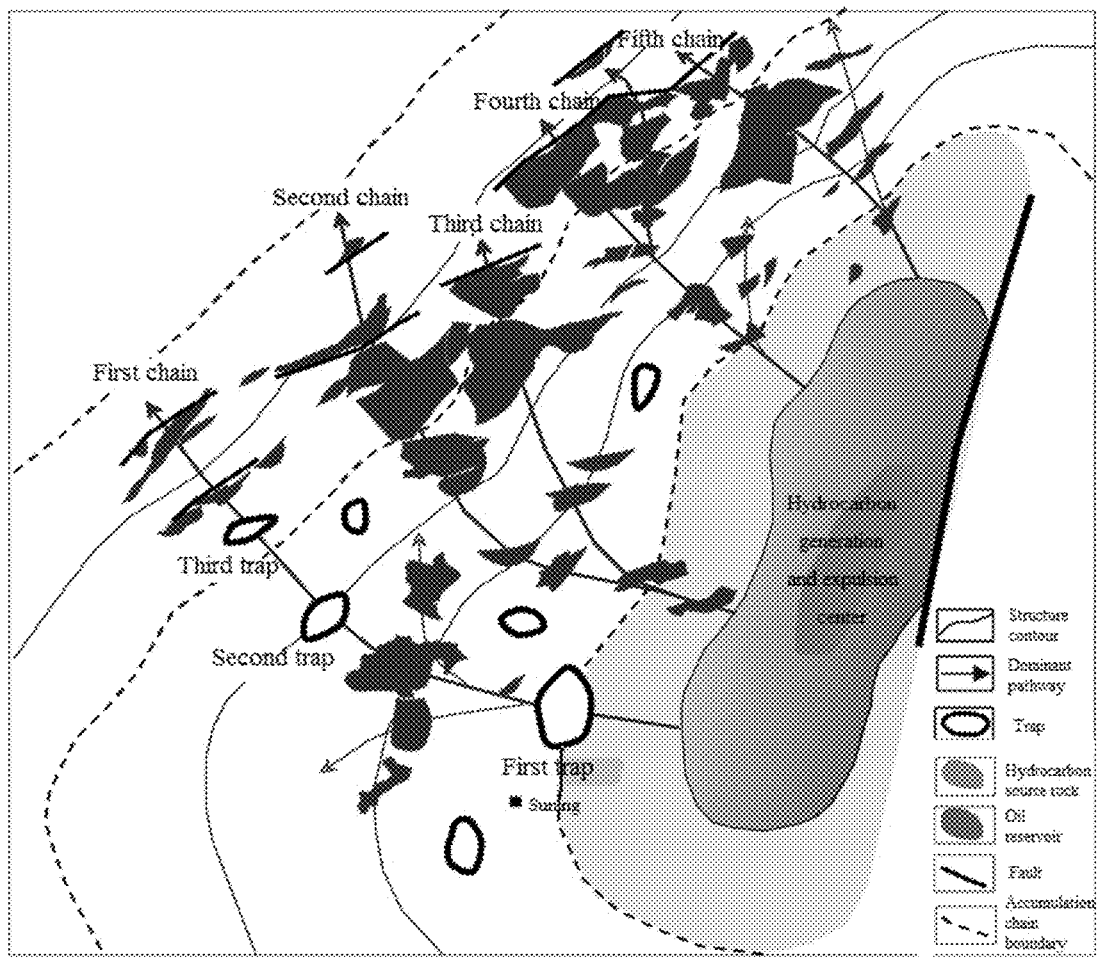
FIG. 5 is a schematic diagram showing an example of an oil-gas reservoir exploration method provided by an embodiment of the present invention.

FIG. 5 is a schematic diagram showing an example of an oil-gas reservoir exploration method provided by an embodiment of the present invention. As shown in FIG. 5, the exemplary description of the oil-gas reservoir exploration method is specifically shown with oil-gas exploration in a basin A as an example. A target stratum m of the basin A is an area where there are abundant oil-gas reservoirs and a batch of oil-gas reservoirs has been discovered. However, some highly hidden oil-gas reservoirs have not been discovered yet, they are gathered in hidden traps so as to be difficult to discover. Structural maps of mature hydrocarbon source rock (a hydrocarbon generation and expulsion center) distribution, reservoir distribution (full-area distribution), trap distribution, discovered oil-gas reservoir distribution and fault distribution included by the target stratum m of the basin A are prepared. Since faults in the area are all closed faults, the situation that the faults are used as oil-gas migration pathways is not taken into account. Five main oil-gas migration paths (pathways) are determined according to distribution of structural ridges formed by contours in the structural maps and form five oil-gas accumulation chains, that is, a first chain, a second chain . . . a fifth chain together with oil-gas reservoirs and traps located on these paths. In a research area, seven complex hidden traps are discovered, but only three traps, that is, a first trap, a second trap and a third trap, are located on a first oil-gas accumulation chain (that is, the first chain). The three traps are located on a dominant migration pathway, have excellent reservoir formation conditions and are possible to form oil-gas reservoirs so as to be favorable exploration targets. The first trap is the largest and is closest to the hydrocarbon generation and expulsion center so as to be the most favorable exploration target; the second trap is the second largest and is closer to the hydrocarbon source rock than the third trap so as to be a second favorable exploration target; and the third trap is a third favorable exploration target. Therefore, the first trap, the second trap and the third trap are sequentially subjected to oil-gas exploration in the area.

Figure 6:
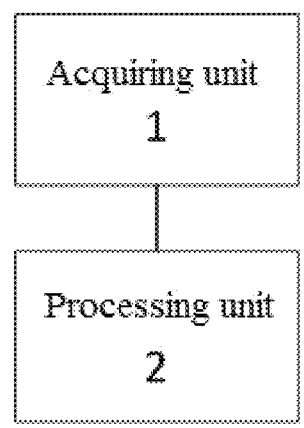
FIG. 6 is a block diagram showing a structure of an oil-gas reservoir exploration apparatus provided by an embodiment of the present invention.

FIG. 6 is a block diagram showing a structure of an oil-gas reservoir exploration apparatus provided by an embodiment of the present invention. As shown in FIG. 5, the apparatus includes: an acquiring unit 1 and a processing unit 2, wherein the acquiring unit 1 is configured to acquire hydrocarbon source rock distribution, reservoir distribution, fault distribution and oil-gas reservoir distribution; and the processing unit 2 is configured to: determine at least one oil-gas accumulation chain according to the hydrocarbon source rock distribution, the reservoir distribution, the fault distribution and the oil-gas reservoir distribution; and determine exploration targets and an exploration order of oil-gas reservoirs according to the at least one oil-gas accumulation chain and the oil-gas reservoirs on the oil-gas accumulation chain.

Further, the acquiring unit 1 is configured to: acquire trap distribution, unconventional oil-gas reservoir distribution and/or discovered oil-gas reservoir distribution.

Further, the processing unit 2 is configured to: determine at least one dominant migration path for oil-gas to migrate from a hydrocarbon source according to the hydrocarbon source rock distribution, the reservoir distribution and the fault distribution; and determine the at least one oil-gas accumulation chain based on the oil-gas reservoir distribution according to the at least one dominant migration path.

Further, the processing unit 2 is configured to: determine connecting paths from the hydrocarbon source to structural ridges of continuously distributed reservoirs and structural ridges of faults as the at least one dominant migration path.

Further, the processing unit 2 is configured to: determine an oil-gas accumulation chain with the most traps and/or sweet spots of unconventional oil-gas reservoirs in the at least one oil-gas accumulation chain as a to-be-explored oil-gas accumulation chain; determine traps and/or sweet spots of unconventional oil-gas reservoirs on the to-be-explored oil-gas accumulation chain as the exploration targets of the oil-gas reservoirs; and determine the exploration order of the oil-gas reservoirs according to sizes of the traps and/or the sweet spots of unconventional oil-gas reservoirs on the to-be-explored oil-gas accumulation chain and distances from the traps and/or the sweet spots to the hydrocarbon source.

An embodiment of the above-mentioned oil-gas reservoir exploration apparatus is similar to the embodiment of the above-mentioned oil-gas reservoir exploration method, the descriptions thereof are omitted herein.

The oil-gas reservoir exploration apparatus includes a processor and a memory, an acquiring unit and a processing unit are both used as program units to be stored in the memory, and the processor executes the above-mentioned program units stored in the memory to achieve corresponding functions.

The processor includes one or more inner cores by which the corresponding program units are called from the memory. Exploration targets and an exploration order may be precisely and rapidly determined by adjusting parameters of the inner cores.

The memory may include a volatile memory, a random access memory (RAM) and/or a non-volatile internal memory or other forms such as a read-only memory (ROM) or a flash memory (flash RAM) in a computer readable medium, and the memory includes at least one storage chip.

An embodiment of the present invention provides a storage medium on which a program is stored, and the oil-gas reservoir exploration method is implemented when the program is executed by the processor.

An embodiment of the present invention provides a processor for operating a program, wherein the oil-gas reservoir exploration method is implemented when the program operates.

An embodiment of the present invention provides a device including a processor, a memory and a program stored on the memory and capable of operating on the processor. When the processor executes the program, the steps are implemented as follows:

hydrocarbon source rock distribution, reservoir distribution, fault distribution and oil-gas reservoir distribution are acquired; at least one oil-gas accumulation chain is determined according to the hydrocarbon source rock distribution, the reservoir distribution, the fault distribution and the oil-gas reservoir distribution; and exploration targets and an exploration order of oil-gas reservoirs are determined according to the at least one oil-gas accumulation chain and the oil-gas reservoirs on the oil-gas accumulation chain.

Further, acquiring oil-gas reservoir distribution comprises: acquiring trap distribution, unconventional oil-gas reservoir distribution and/or discovered oil-gas reservoir distribution.

Further, determining at least one oil-gas accumulation chain according to the hydrocarbon source rock distribution, the reservoir distribution, the fault distribution and the oil-gas reservoir distribution comprises: determining at least one dominant migration path for oil-gas to migrate from a hydrocarbon source according to the hydrocarbon source rock distribution, the reservoir distribution and the fault distribution; and determining the at least one oil-gas accumulation chain based on the oil-gas reservoir distribution according to the at least one dominant migration path.

Further, determining at least one dominant migration path for oil-gas to migrate from a hydrocarbon source according to the hydrocarbon source rock distribution, the reservoir distribution and the fault distribution comprises: determining connecting paths from the hydrocarbon source to structural ridges of continuously distributed reservoirs and structural ridges of faults as the at least one dominant migration path.

Further, determining exploration targets and an exploration order of oil-gas reservoirs according to the at least one oil-gas accumulation chain and the oil-gas reservoirs on the oil-gas accumulation chain comprises: determining an oil-gas accumulation chain with the most traps and/or sweet spots of unconventional oil-gas reservoirs in the at least one oil-gas accumulation chain as a to-be-explored oil-gas accumulation chain; determining traps and/or sweet spots of unconventional oil-gas reservoirs on the to-be-explored oil-gas accumulation chain as the exploration targets of the oil-gas reservoirs; and determining the exploration order of the oil-gas reservoirs according to sizes of the traps and/or the sweet spots of unconventional oil-gas reservoirs on the to-be-explored oil-gas accumulation chain and distances from the traps and/or the sweet spots to the hydrocarbon source.

The device described herein may be a server, a PC, a PAD, a mobile phone and the like.

The present invention further provides a computer program product suitable for executing the following program in which the steps of the following method are initialized during implementation on a data processing device:

hydrocarbon source rock distribution, reservoir distribution, fault distribution and oil-gas reservoir distribution are acquired; at least one oil-gas accumulation chain is determined according to the hydrocarbon source rock distribution, the reservoir distribution, the fault distribution and the oil-gas reservoir distribution; and exploration targets and an exploration order of oil-gas reservoirs are determined according to the at least one oil-gas accumulation chain and the oil-gas reservoirs on the oil-gas accumulation chain.

Further, acquiring oil-gas reservoir distribution comprises: acquiring trap distribution, unconventional oil-gas reservoir distribution and/or discovered oil-gas reservoir distribution.

Further, determining at least one oil-gas accumulation chain according to the hydrocarbon source rock distribution, the reservoir distribution, the fault distribution and the oil-gas reservoir distribution comprises: determining at least one dominant migration path for oil-gas to migrate from a hydrocarbon source according to the hydrocarbon source rock distribution, the reservoir distribution and the fault distribution; and determining the at least one oil-gas accumulation chain based on the oil-gas reservoir distribution according to the at least one dominant migration path.

Further, determining at least one dominant migration path for oil-gas to migrate from a hydrocarbon source according to the hydrocarbon source rock distribution, the reservoir distribution and the fault distribution comprises: determining connecting paths from the hydrocarbon source to structural ridges of continuously distributed reservoirs and structural ridges of faults as the at least one dominant migration path.

Further, determining exploration targets and an exploration order of oil-gas reservoirs according to the at least one oil-gas accumulation chain and the oil-gas reservoirs on the oil-gas accumulation chain comprises: determining an oil-gas accumulation chain with the most traps and/or sweet spots of unconventional oil-gas reservoirs in the at least one oil-gas accumulation chain as a to-be-explored oil-gas accumulation chain; determining traps and/or sweet spots of unconventional oil-gas reservoirs on the to-be-explored oil-gas accumulation chain as the exploration targets of the oil-gas reservoirs; and determining the exploration order of the oil-gas reservoirs according to sizes of the traps and/or the sweet spots of unconventional oil-gas reservoirs on the to-be-explored oil-gas accumulation chain and distances from the traps and/or the sweet spots to the hydrocarbon source.

Preferable embodiments of the present invention are described in detail above in conjunction with accompanying drawings. However, the present invention is not limited by details of the embodiments, technical solutions of the present invention can be subjected to multiple simple transformations within the technical conception scope of the present invention, and the simple transformations all fall into the protection scope of the present invention.

What needs to be additionally explained is that in case of no conflict, specific technical features described by above-mentioned specific embodiments can be combined in any appropriate mode, and to avoid unnecessary repeat, probable combination modes are not described additionally.

In addition, different embodiments of the present invention can also be arbitrarily combined, and should also be regarded as content disclosed by the present invention as long as ideas of the present invention are not obeyed.

The invention claimed is:

1. An oil-gas reservoir exploration apparatus, comprising:
an acquiring unit, a processing unit, and an oil trap drill, wherein
the acquiring unit is configured to acquire hydrocarbon source rock distribution, reservoir distribution, fault distribution and oil-gas reservoir distribution;
the processing unit is configured to:
determine at least one oil-gas accumulation chain according to the hydrocarbon source rock distribution, the reservoir distribution, the fault distribution and the oil-gas reservoir distribution; and
determine exploration targets and an exploration order of oil-gas reservoirs according to the at least one oil-gas accumulation chain and the oil-gas reservoirs on the oil-gas accumulation chain, and
the oil trap drill is configured to explore at least a first oil-gas reservoir and a second oil-gas reservoir located on the at least one oil-gas accumulation chain, according to the exploration order determined by the processing unit.

2. The oil-gas reservoir exploration apparatus according to claim 1, wherein the acquiring unit is configured to:
acquire trap distribution, unconventional oil-gas reservoir distribution and/or discovered oil-gas reservoir distribution.

3. The oil-gas reservoir exploration apparatus according to claim 1, wherein the processing unit is configured to:
determine at least one dominant migration path for oil-gas to migrate from a hydrocarbon source according to the hydrocarbon source rock distribution, the reservoir distribution and the fault distribution; and
determine the at least one oil-gas accumulation chain based on the oil-gas reservoir distribution according to the at least one dominant migration path.

4. The oil-gas reservoir exploration apparatus according to claim 3, wherein the processing unit is configured to:
determine connecting paths from the hydrocarbon source to structural ridges of continuously distributed reservoirs and structural ridges of faults as the at least one dominant migration path.

5. The oil-gas reservoir exploration apparatus according to claim 2, wherein the processing unit is configured to:
determine an oil-gas accumulation chain with the most traps and/or sweet spots of unconventional oil-gas reservoirs in the at least one oil-gas accumulation chain as a to-be-explored oil-gas accumulation chain;
determine traps and/or sweet spots of unconventional oil-gas reservoirs on the to-be-explored oil-gas accumulation chain as the exploration targets of the oil-gas reservoirs; and
determine the exploration order of the oil-gas reservoirs according to sizes of the traps and/or the sweet spots of unconventional oil-gas reservoirs on the to-be-explored oil-gas accumulation chain and distances from the traps and/or the sweet spots to the hydrocarbon source.

* * * * *